United States Patent
Wolfert

(10) Patent No.: US 12,163,211 B2
(45) Date of Patent: Dec. 10, 2024

(54) METHOD FOR MANUFACTURING OR MODIFYING AN ENDODONTIC INSTRUMENT OF NITI ALLOY

(71) Applicant: Coltène/Whaledent GmbH + Co. KG, Langenau (DE)

(72) Inventor: Johannes Wolfert, Langweid (DE)

(73) Assignee: Coltène/Whaledent GmbH & Co. KG, Langenau (DE)

( * ) Notice: Subject to any disclaimer, the term of this patent is extended or adjusted under 35 U.S.C. 154(b) by 411 days.

(21) Appl. No.: 17/613,831

(22) PCT Filed: May 19, 2020

(86) PCT No.: PCT/EP2020/063911
§ 371 (c)(1),
(2) Date: Nov. 23, 2021

(87) PCT Pub. No.: WO2020/239527
PCT Pub. Date: Dec. 3, 2020

(65) Prior Publication Data
US 2022/0243311 A1    Aug. 4, 2022

(30) Foreign Application Priority Data
May 24, 2019   (EP) .................................. 19176568

(51) Int. Cl.
C22F 1/18       (2006.01)
A61C 5/42       (2017.01)
C22F 1/00       (2006.01)
C22F 1/10       (2006.01)

(52) U.S. Cl.
CPC .................. *C22F 1/10* (2013.01); *A61C 5/42* (2017.02); *C22F 1/006* (2013.01); *C22F 1/183* (2013.01); *A61C 2201/007* (2013.01)

(58) Field of Classification Search
CPC .. C22F 1/006; C22F 1/10; C22F 1/183; A61C 5/40; A61C 5/42; A61C 2201/007
See application file for complete search history.

(56) References Cited

U.S. PATENT DOCUMENTS

| | | |
|---|---|---|
| 6,258,182 B1 | 7/2001 | Schetky et al. |
| 2011/0159458 A1* | 6/2011 | Heath ..................... C22F 1/183 148/714 |
| 2012/0208145 A1 | 8/2012 | Heath et al. |
| 2012/0282571 A1 | 11/2012 | Ammon et al. |

FOREIGN PATENT DOCUMENTS

WO       2020239527 A1    12/2020

OTHER PUBLICATIONS

International Search Report received for International Application No. PCT/EP2020/063911 dated Aug. 11, 2020, 4 pages.
Written Opinion of the International Searching Authority received for International Application No. PCT/EP2020/063911 dated Aug. 11, 2020, 6 pages.

* cited by examiner

*Primary Examiner* — Jessee R Roe
(74) *Attorney, Agent, or Firm* — Finch & Maloney PLLC

(57) ABSTRACT

The invention relates to a method for manufacturing or modifying an endodontic instrument made from an NiTi alloy, comprising a heat-treatment. The invention further relates to an endodontic instrument, preferably obtained by the method, having superior properties with regard to cyclic fatigue resilience.

6 Claims, 5 Drawing Sheets

Figure 1:
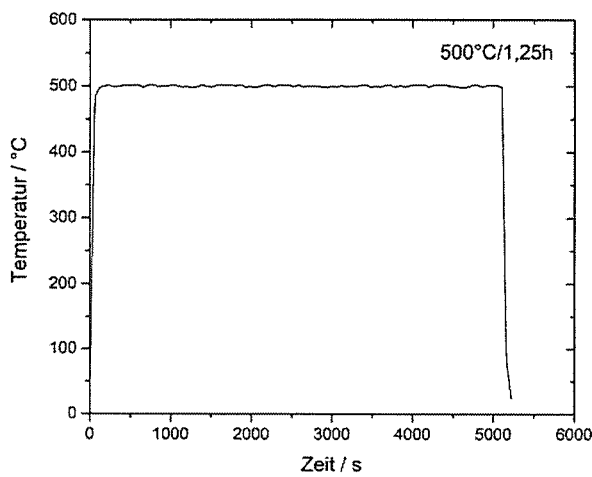

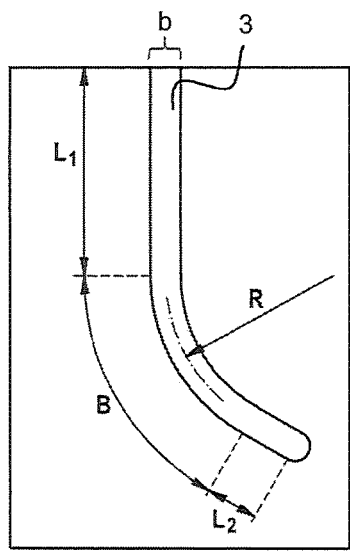
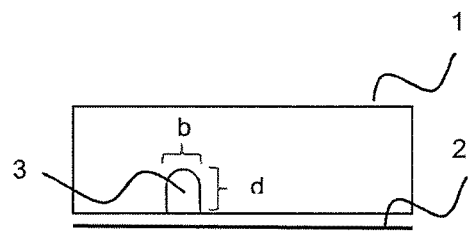
Fig 4a                               Fig 4b
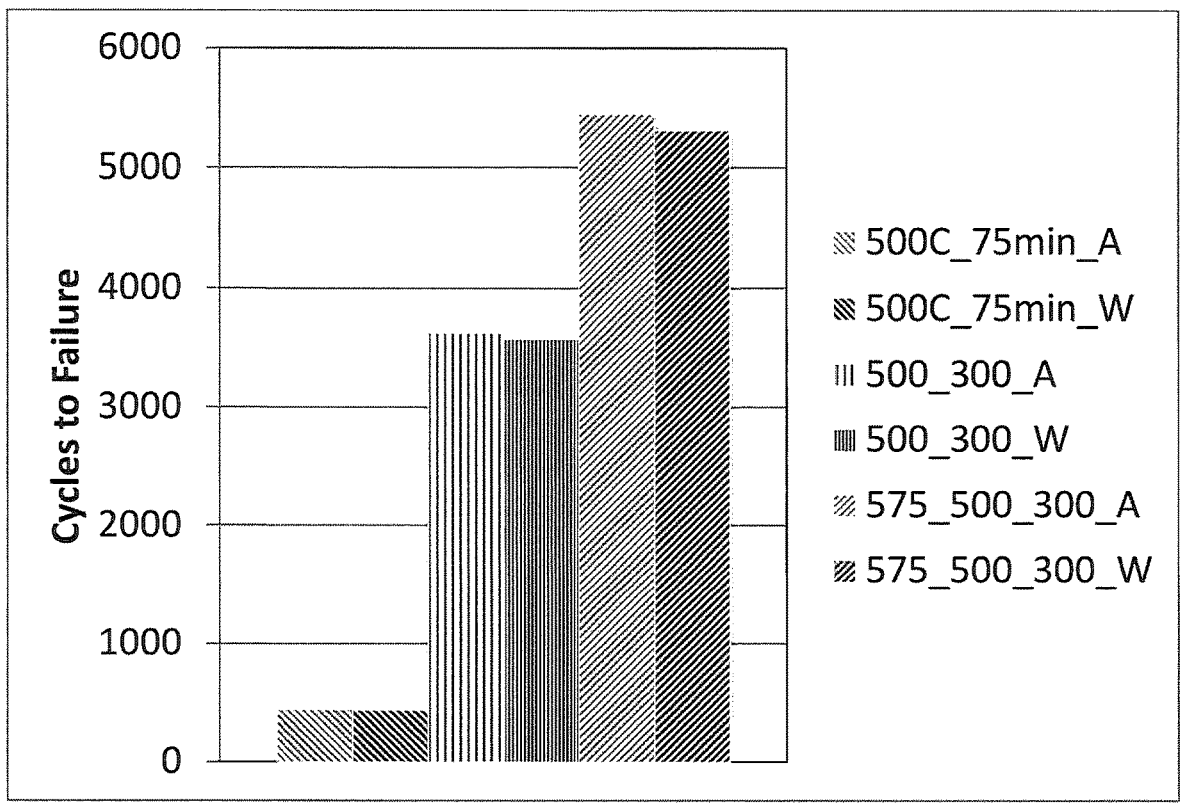
Fig 5

METHOD FOR MANUFACTURING OR MODIFYING AN ENDODONTIC INSTRUMENT OF NITI ALLOY

The invention relates to the technical field of instruments for use in dentistry. More specifically, the invention relates to an endodontic instrument for root canal treatment.

In root canal treatments, endodontic instruments are used to clean and enlarge the long, narrow tapered root canal. In order for the file to adapt to the shape of the root canal, the file must be flexible. It has been suggested to use files which are super-elastic. Typically, in order to obtain super elasticity, a nickel titanium alloy (NiTi) is used, wherein for example 55 weight-% can be of nickel and 45 weight-% can be of titanium (EP 1 745 757). However, the file must also meet high expectations as to stress and strain resistance as well as cyclic fatigue.

One of the most important properties of an endodontic file for root canal treatment is good resilience to cyclic fatigue. If the endodontic file breaks when rotating inside the curved root canal, removal of the fragment is difficult, time consuming and the involved health risks for the patient considerable.

It has been suggested in the art to treat endodontic instrument blanks of NiTi alloys with temperatures of approximately 500° C. to the NiTi alloys during 1 to 2 hrs in order to obtain high resistance to torsion breakage, to maintain shape upon fraction and to provide sharp cutting edges (EP 1 753 361). In the same publication, it has also been suggested to apply coatings by vapour deposition, inherently including a heat treatment.

EP 3 375 557 discloses blanks for endodontic instruments that undergo a surface treatment (electrical discharge machining). Such EDM treatment inherently includes development of heat. However, the time of heat input is short and the method is chosen for its effects on the properties of the file's surface.

While heat-treatments of blanks for endodontic files are therefore known in the art, cyclic fatigue resistance of such files continues to be unsatisfactory. In particular, when blanks are subject to only short temperature cycles of approximately one hour, the blank's cyclic fatigue properties remain unchanged or even deteriorate compared to untreated files. This may be due to detrimental oxidation of the file's surface, low phase transition temperature and/or structural defects in the material.

It is therefore the purpose of the present invention to overcome the disadvantages of the endodontic instruments known in the art. More specifically, it is the purpose of the invention to provide a method for manufacturing or modifying an endodontic instrument made from super-elastic NiTi alloy which has enhanced resilience to cyclic fatigue and is thus more convenient, more long lasting and safer for use in root canal treatments.

The purpose is achieved by the method and the endodontic instrument according to the independent claims.

The method is directed to manufacturing or modifying an endodontic instrument made from nickel titanium alloy (hereinafter: Ni—Ti alloy). The method includes performing a heat-treatment comprising the steps of providing a NiTi endodontic instrument made of a shape memory alloy, preferably with superelastic properties at 25° C.;

heating the endodontic instrument to a first temperature range between 550° C. and 625° C., preferably between 560° C. and 610° C., more preferably between 260° C. and 600° C., even more preferably between 570° C. and 590° C.;

keeping the endodontic instrument in the first temperature range during a first time period of 20 min to 90 min, preferably 30 min to 70 min, and more preferably 45 min to 60 min, and subsequently allowing the endodontic instrument to cool down to a second temperature range between 400° C. and 549° C., preferably between 450° C. and 530° C., and more preferably between 475° C. and 515° C., keeping said endodontic instrument in the second temperature range during a second time period of at least 180 min, preferably between 190 and 300 min, more preferably between 210 and 270 min, even more preferably between 220 and 260 min.

The NiTi endodontic instrument with super elastic properties is made from an alloy as is known in the art. The titanium alloy may for example be selected from alpha-titanium alloys, beta-titanium alloys, alpha-beta-titanium alloys, and nickel-titanium alloys. Non-limiting examples of alpha-titanium alloys, beta-titanium alloys, alpha-beta-titanium alloys for use in this embodiment of the invention are: Ti-5Al-2.5Sn alpha alloy; Ti-5Al2.5Sn-ELI (low O2) alpha alloy; Ti-3Al-2.5V alpha alloy; Ti-5Al5Zr-5Sn alpha alloy; Ti-6Al-2Cb-1Ta-0.8Mo alpha alloy; Ti-5Al-5Sn-2Zr-2Mo-0.25Si near alpha alloy; Ti-6Al-2Nb-1Ta-1Mo near alpha alloy; Ti-8Al-1Mo-1V near alpha alloy; Ti-6Al-2Sn-4Zr-2Mo near alpha alloy; Ti-6Al-2Sn-1.5Zr-1Mo-0.35Bi-0.1 Si near alpha alloy; Ti-2.25-Al-11Sn-5Zr-1Mo-0.2Si near alpha alloy; Ti-3Al-2.5V alpha-beta alloy; Ti-10V-2Fe-3Al alpha-beta alloy; Ti-5Al2Sn-2Zr-4Mo-4Cr alpha-beta alloy; Ti-6Al-2Sn-4Zr-6Mo alpha-beta alloy; Ti-4Al-4Mn alpha-beta alloy; Ti-6Al-2Sn-2Zr-2Mo-2Cr0.25Si alpha-beta alloy; Ti-4Al-3Mo-1V alpha-beta alloy; Ti-6Al-2Sn-4Zr-6Mo alpha-beta alloy; Ti-11 Sn-5Zr-2Al-1 Mo alpha-beta alloy; Ti-6Al-4V alpha-beta alloy; Ti-6Al-4V-ELI (low O2) alpha-beta alloy; Ti-6Al-6V-2Sn-0.75Cu alpha-beta alloy; Ti-7Al-4Mo alpha-beta alloy; Ti-6Al-2Sn-4Zr-2Mo alpha-beta alloy; Ti-,5Al-1.5Fe-1.5Cr-1.5Mo alpha-beta alloy; Ti-8Mn alpha-beta alloy; Ti8Mo-8V-2Fe-3Al beta alloy; Ti-11.5Mo-6Zr-4.5Sn beta alloy; Ti3Al-8V-6Cr-4Mo-4Zr beta alloy; and Ti-3Al-13V-11Cr beta alloy (the numbers being percent by weight). The titanium alloy used for the shank may include 54-57 weight percent nickel and 43-46 weight percent titanium. The NiTi alloy may or may not include stabilizing amounts of a metal selected from molybdenum, tin, bismuth, tantalum, vanadium, zirconium, niobium, chromium, cobalt, nickel, manganese, iron, aluminum, copper and/or lanthanum.

It has been shown, that by means of the heat-treatment, superior cyclic fatigue properties of the finished instrument can be achieved as well as excellent tensile strength. The heat-treatment requires at least two treatment steps at distinct temperatures: The first step of the heat treatment is performed at relatively high temperatures and the second step of the heat treatment is performed at distinctly lower temperatures but over a longer period of time. The steps are required in combination to achieve the improved results of this invention. The treatment shifts the alloy's transition temperature to 37° C. and above, corrects defects in the microstructure of the material and relieves stress. The alloy undergoes homogenization. Crack initiation and propagation are reduced and the material is better apt to compensate for mechanical loads. The over-all impact of the heat-treatment at a first and a second temperature range is a substantially increased resistance to cyclic fatigue of the finished instrument.

It is preferred that the working portion of the endodontic instrument in an unloaded state is substantially linear, in particular the endodontic instrument has no bend-shape, curve-shape or spiral-shape in an unloaded state. By unloaded state is meant that no mechanical force is applied onto the instrument. It is not a function of either the first or the second step of the heat treatment to deflect a portion of the endodontic file and/or to orientate a portion of the endodontic file into a predetermined nonlinear shape. In particular, neither the first nor the second step of the heat treatment are performed such that the file is placed into a shaping section of a mould for receiving portions of a conventional file and hence forcing them into a curved shape, spiral shape, corkscrew shape, etc.

In a preferred embodiment, after keeping the endodontic instrument in the second temperature range, the endodontic instrument is allowed to cool down to a third temperature range between 250° C. and 350° C., preferably between 275° C. to 325° C., over a time period of 90 min to 150 min, preferably over a time period of 110 min to 130 min. It is particularly preferred that the cooling rate is kept constant, i.e. has a substantially constant value between 0.2° C./min and 3.3° C./min with variations no higher than ±30%. Controlled cooling may support homogenous phase transition temperature over the length and the cross section of the finished material.

After the heat treatment, the endodontic instrument is preferably allowed to cool in the air at ambient conditions, i.e. at a temperature of 25° C. and 1000 bar. The endodontic instruments may also be quenched by placing the endodontic instrument in a liquid bath, preferably in water. However, the cooling at ambient air has proven slightly better for the resulting resistance of the instrument to cyclic fatigue.

It is preferred that at least the heat treatment steps which occur in the first temperature range are performed in vacuum or in inert gaseous atmosphere. More precisely, whenever the endodontic instrument is kept at temperatures of 550° C. and above, an inert gaseous atmosphere, for example of argon, krypton, xenon, radon, or a vacuum is maintained in order to prevent the file's surface from oxidization.

The temperature over time within the specified first range and the specified second range can be constant, rising, decreasing or curved with one or several local maxima or minima. However, it is preferred that the endodontic instrument is kept during the first period of time at a first substantially constant temperature and/or during the second period of time at a second substantially constant temperature. It is particularly preferred that the instrument is kept during the first time period at a first constant temperature, for example at 575° C. (±2° C.), and also during the second time period at a second constant temperature, for example at 500° C. (±2° C.)

An aspect of the invention relates to an endodontic instrument obtained by a method as describe above. An endodontic instrument obtained by a method as describe above has several advantageous properties. In particular, the endodontic instrument has elevated resistance to cyclic fatigue and can well compensate for mechanical strain by deformation.

It is preferred that the endodontic instrument as described above in an unloaded state is substantially linear, in particular the working portion of the endodontic instrument has no bend-shape, curve-shape or spiral-shape in an unloaded state. Predetermined shaping is not necessary since the endodontic file has appropriate flexibility to adapt to a curved root canal due to the materials and methods used.

An aspect of the invention relates to an endodontic instrument, preferably obtained according to the method described above, wherein the endodontic instrument has a mean number of cycles to failure of at least 4000, preferably of at least 4300, more preferably of at least 4500.

By "mean" is understood the arithmetic mean. The number of cycles to failure is measured by rotating the samples in a curved groove, carved out from a stainless steel block and covered with a glass plate, until breakage of the sample. The groove had a breadth b of 1.5 mm, a depth d of 2 mm, a total length $L_1+B+L_2$ of 2.1 cm, with $L_1$ being 10.5 mm and $L_2$ being 3 mm, and a curvature over and arc length B of 60° with a curvature radius R of 8.25 mm. The files were mounted to an endo motor and introduced to a maximal extent into the stainless steel canal whilst not touching the canal's front end. Testing was performed at 20° C. and at a rotational speed of 500 rpm. The number of rotations was counted by optical means (monitoring through the glass plate which laterally closes off the stainless steel groove).

It is an aspect of the invention that the endodontic instrument has a performance in cyclic fatigue tests improved by at least 20%, preferably by at least 25%, calculated from cyclic fatigue values of identical files
which were subject to only the steps of the heat-treatment occurring within the first temperature range; or
which were subject to only the steps of the heat-treatment occurring within the second temperature range.

Such an instrument can be obtained by a method as described above.

In particular, the endodontic instrument has pseudo-plastic behaviour at room temperature of 25° C., and superelastic behaviour at temperatures above the endodontic instrument's phase transition temperature. The endodontic instrument has a phase transition temperature of at least 37° C., preferably at least 40° C., more preferably between 45 and 70° C., measured according to a bend and free recovery test method based on ASTM F2082/F2082M. For the bend and free recovery test method based on ASTM F2082/F2082M, the file is cooled to its nominally fully martensic phase. The file is then deformed and its broader, proximal end fixed in a holder. The specimen is heated in ambient air to its fully austenitic phase. During heating, the motion of a marker applied to the specimen's tip is measured and plotted versus the specimen temperature. Temperature increase (1K/min) is applied until complete recovery of the file into its initial shape. The austenite finish temperature ($A_f$; definitions according to the Standard Terminology for NiTi Shape Memory Alloys, F2005-05(2015)) is measured using a 90 percent recoverable deformation methodology. Unless otherwise specified herein, the parameters according to ASTM F2082/2082M are applied.

The phase transition temperature accounts for the alloy's excellent ability to compensate for mechanical loads by deformation, in particular at the relevant temperatures present during root canal treatment.

The invention can be understood better based on the following Examples and Figures. The Examples are presented in order to further illustrate the invention and are not intended to limit the invention.

Shown is in

Figure 2:
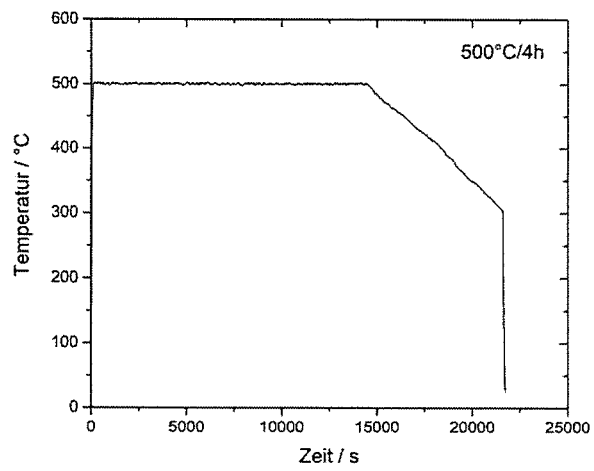
Figure 3:
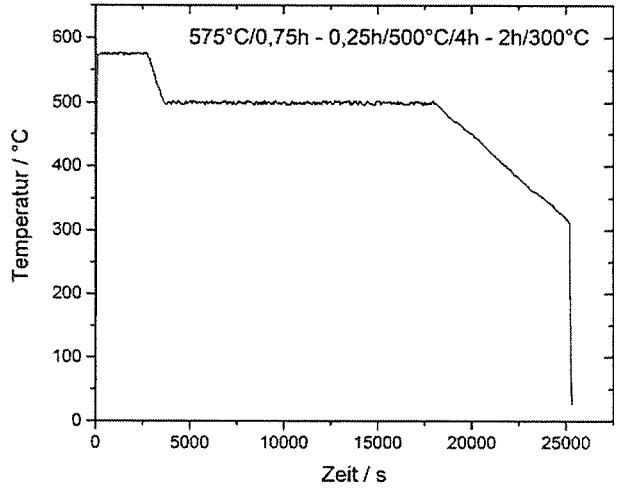
Figure 6:
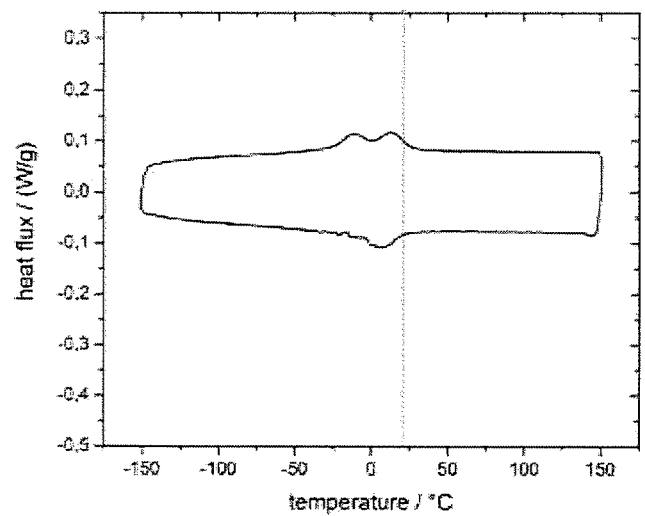
Figure 7:
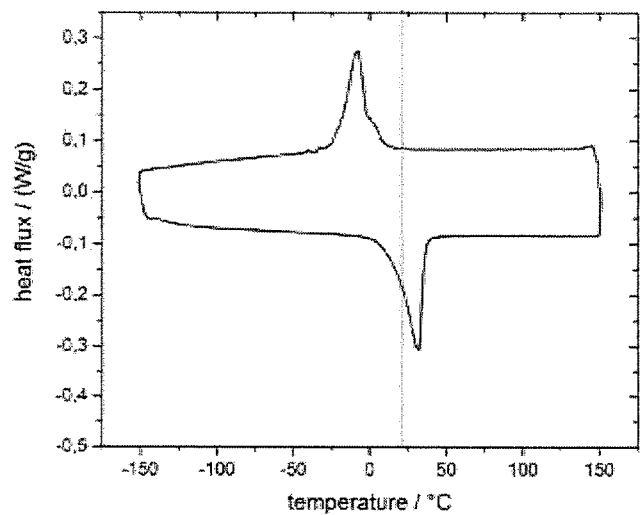
Figure 8:
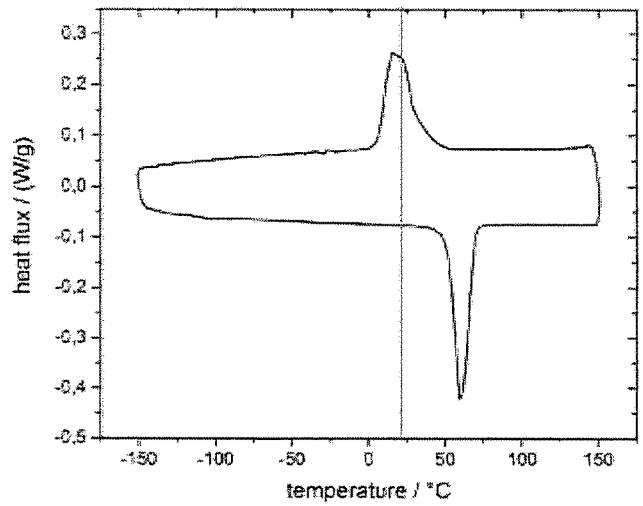
Figure 9:
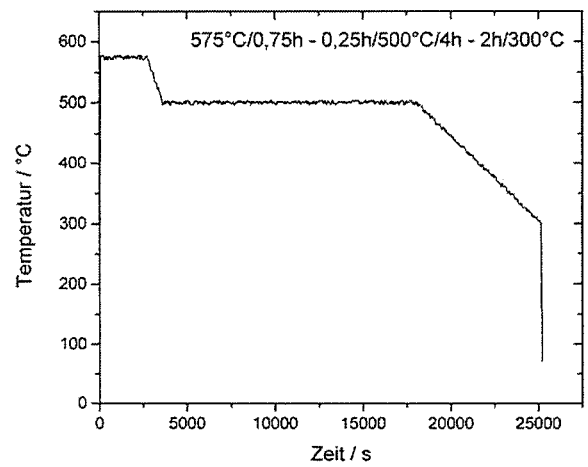
Figure 10:
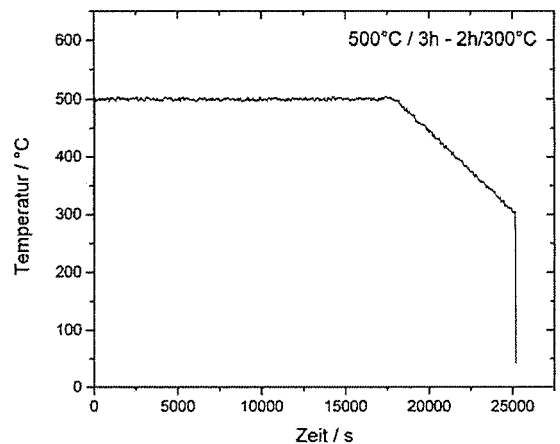
Figure 11:
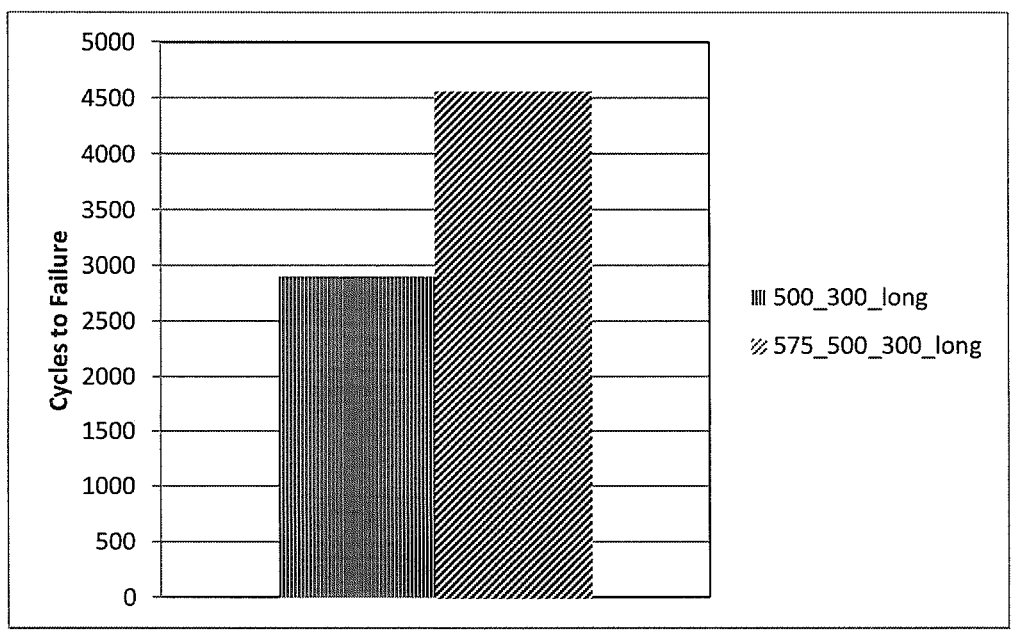
Figure 12:
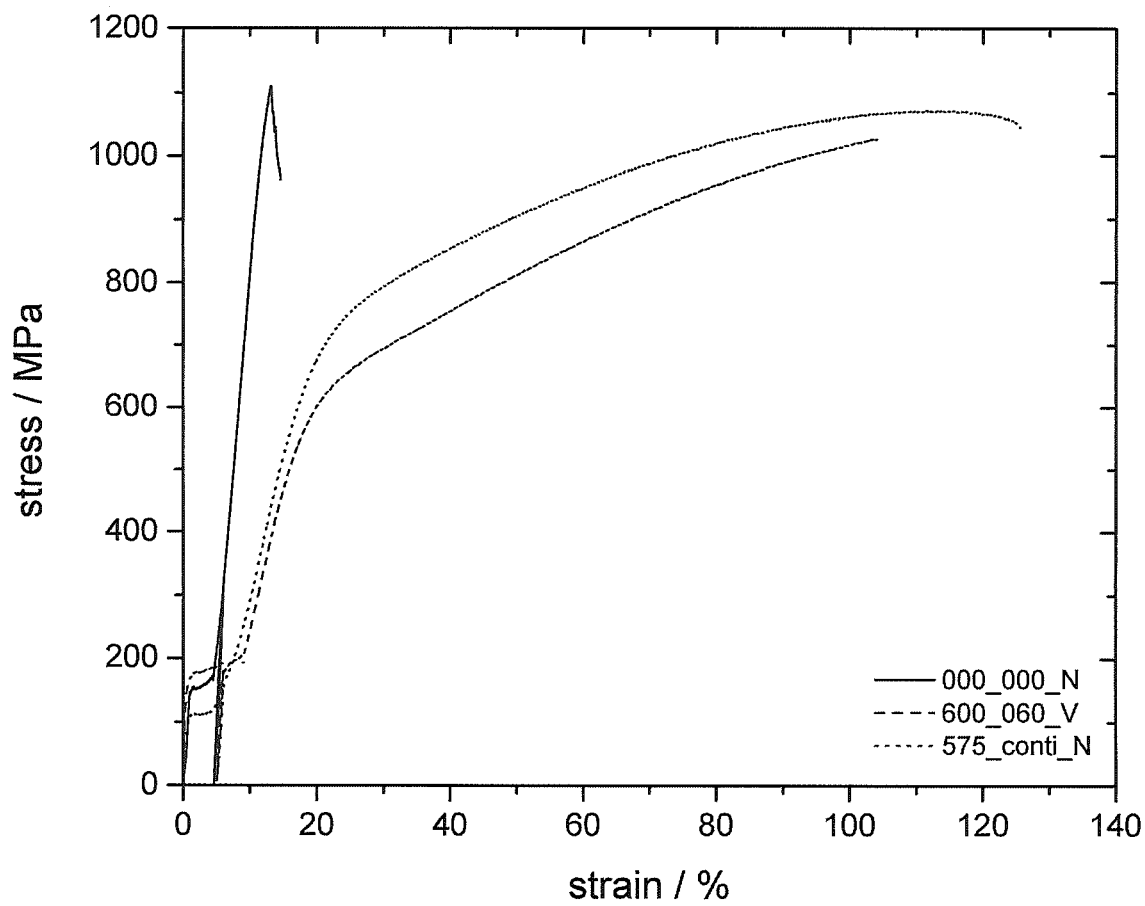

FIG. 1: profile of temperature over time in a simple treatment of files "500 C_75 min";

FIG. 2: profile of temperature over time in a simple treatment of files "500_300", under controlled cooling;

FIG. 3: profile of temperature over time in a treatment at a first and a second temperature range "575_500_300", under controlled cooling;

FIG. 4a: front view of a measurement setup of the cyclic fatigue testing groove;

FIG. 4b: top view on the measurement canal setup of the cyclic fatigue testing groove;

FIG. 5: results of the cyclic fatigue test (Example 1);

FIG. 6: DSC diagram of untreated NiTi-control wires;

FIG. 7: DSC diagram of NiTi wires subject to a simple treatment (600° C. for 1 hr);

FIG. 8: DSC diagram of NiTi wires subject to a temperature treatment at a first and a second temperature range (600° C. for 1 hr and subsequent exposure to 500° C. for 3.5 hrs, cooling to 300° over 2 hrs);

FIG. 9: profile of temperature over time in a treatment of a second batch of files at a first and a second temperature range "575_500_300 long";

FIG. 10: profile of temperature over time in a simple treatment of files of a second batch "500 C_300_long";

FIG. 11: results of the cyclic fatigue test of the files from the second batch (Example 2);

FIG. 12: results of the tensile stress.

EXAMPLE 1

60 HyFlex CM Files by Coltene (size/taper 30/0.04) of NiTi-alloy having super-elastic properties were provided. The files had a working portion extending from a distal end of the shank along around an axial length of the shank provided with at least one cutting blade in a spiral shape. The files were manufactured by grinding. Manufacturing included an extent of cold working but might also include annealing steps.

Ensembles of 10 files each were placed in titanium containers (grade 1). Two of the titanium containers (i.e. 20 files) were placed in a quartz holder and covered by a getter material. The three quartz holders were subsequently and individually put into a vacuum-furnace for treatment as shown in FIGS. 1 to 3. Pressure in the furnace was reduced to $3*10^{-3}$ bar and the samples set under a 0.21/min stream of argon gas.

Twenty files 500 C_75 min were kept at 500° C. for 75 min; 10 of them were quenched in water immediately after heat treatment, 10 of them were cooled in ambient air (FIG. 1).

Twenty files 500_300 were kept at 500° C. for 4 hrs and allowed to cool down to 300° C. over 2 hrs at a constant cooling rate of 1.7° C./min; 10 of them were quenched in water immediately after the heat treatment, 10 of them were cooled at ambient air (FIG. 2).

Twenty files 575_500_300 were kept at 575° C. for 45 min, allowed to cool down to 500° C. over 15 min, kept at 500° C. for 4 hrs and allowed to cool down to 300° C. over 2 hrs at a constant cooling rate of 1.7° C./min; 10 of the files were quenched in water immediately after the heat treatment, 10 of them were cooled at ambient air (FIG. 3).

Cyclic fatigue was measured by rotating the samples in a curved groove carved out from a stainless steel block and covered with a glass plate, until breakage of the sample. The groove had a breadth b of 1.5 mm, a depth d of 2 mm, a total length $L_1+B+L_2$ of 2.1 cm, with $L_1$ being 10.5 mm and $L_2$ being 3 mm, and a curvature over and arc length B of 60° with a curvature radius R of 8.25 mm. FIG. 4a is a schematic front view of the stainless steel block 1 with the curved out groove 3. The glass plate is not shown in FIG. 4a. FIG. 4b is a top view of the stainless steel block 1 having a groove 3 with dimensions b and d. The glass plate 2 is mounted to cover the entire extension of the groove 3 carved out of the stainless steel block. The files were mounted to an endo motor and introduced to a maximal extent into the stainless steel groove, covered with the glass plate whilst not touching the canal's front end. Testing was performed at 20° C. and at a rotational speed of 500 rpm. The number of rotations was counted by optical means (monitoring through the glass plate 2 which laterally closes off the stainless steel groove).

As can be seen from FIG. 5, the files having undergone simple treatment at 500° during only 75 min (500 C_75 min) performed poorly in the cyclic fatigues test with a mean 444 cycles to failure (quenching in water; 500 C_75 min_W) or a mean 446 cycles to failure (cooling at ambient air; 500 C_75 min_A). The files having undergone simple treatment at 500° C. for 4 hrs with controlled cooling to 300° C. (500_300) performed considerably better, with a mean 3583 cycles to failure (quenching in water; 500_300_W) or a mean 3634 cycles to failure (cooling at ambient air; 500_300_A).

However, the files having undergone combined heat-treatment at a first and a second temperature range (575_500_300) performed clearly better. The samples quenched in water failed after a mean 5315 cycles (575_500_300_W). The samples quenched in the air failed after a mean 5450 cycles (575_500_300_A). This amounts to an improvement of the resistance to cyclic fatigue by at least 48%, calculated from the cyclic fatigue values of the best comparative group (500_300 quenched in water/air respectively). The quenching in ambient air generally improved performance of the files in cyclic fatigue tests as compared to the files which were quenched in water.

The drastic improvement of resistance to cyclic fatigue of files 575_500_300 cannot be explained by mere stress relieve over time in the heat treatment. The effect may be a result of the combined effects of precipitation of Ni-rich $Ni_4Ti_3$, of reduction of microstructural defects and of homogenized microstructure. Thermal characterisation of NiTi-wires by differential scanning calorimetry (DSC) confirms that the heat-treatment impacts phase transition temperature of the alloy. The untreated alloy is austenitic/superelastic at room temperature (FIG. 6). A NiTi-alloy which was subject to 600° C. for 60 min shows more distinct phase transition peaks which occur, however, at relatively low temperatures (FIG. 7). In contrast, a NiTi-alloy which was subject to heat-treatment at a first and a second temperature range according to the invention (600° C. for 1 hr and subsequent exposure to 500° C. for 3.5 hrs, cooling to 300° over 2 hrs) shows clearly defined peaks and a more substantial shift of phase transformation temperatures to values around 60° C. (austenitic transformation) and 20° C. (martensitic transformation; FIG. 8).

It shall be noted that the DSC measurements merely indicate the effect of the heat treatment on the phase transition behaviour of the alloy. For the purposes of this invention, superelasticity and pseudo-plasticity of the endodontic instrument are characterized by the bend and free recovery principle.

EXAMPLE 2

A second batch of 20 pieces of HyFlex CM Files by Coltene (size/taper 30/0.04) of NiTi-alloy with super-elastic properties was provided. As in the previous example, the files had a working portion extending from a distal end of the shank along an axial length of the shank provided with at least one cutting blade in a spiral shape. The files were manufactured by grinding. Manufacturing included an extent of cold working but might also include annealing steps.

Ensembles of 10 files each were placed in two titanium containers (grade 1). The titanium containers were placed in a quartz holder and covered by a getter material (grade 1). The quartz holders were subsequently and individually put into a vacuum-furnace for treatment as shown in FIGS. 6 and 7. Pressure in the furnace was reduced to $3*10^{-3}$ bar and the samples set under a 0.2 l/min stream of argon gas.

Ten files "575_500_300_long" were kept at 575° C. for 45 min, allowed to cool down to 500° C. over 15 min, kept at 500° C. for 4 hrs and allowed to cool down to 300° C. over 2 hrs at a constant cooling rate of 1.7° C./min; they were quenched in water immediately after the heat treatment, while still located in the titanium containers. The temperature is plotted over time in FIG. 9.

Ten files "500_300_long" were kept at 500° C. for 5 hrs and allowed to cool down to 300° C. over 2 hrs at a constant cooling rate of 1.7° C./min; they were quenched in water immediately after the heat treatment, while still located in the titanium containers. The temperature is plotted over time in FIG. 10.

Cyclic fatigue was measured by rotating the samples in a canal formed of stainless steel until breakage as indicated above for Example 1.

As can be seen from FIG. 11, the files having undergone simple treatment at 500° C. for 5 hrs with controlled cooling to 300° C. (500_300_long) performed moderately, with a mean 2908 cycles to failure. In contrast, the files undergone combined heat-treatment at a first and a second temperature range (575_500_300_long) performed clearly better. The samples failed after a mean 4567 cycles. This amounts to an improvement of the resistance to cyclic fatigue by at least 55%, calculated from the cyclic fatigue values of the comparative group (500_300_long).

In order to complement the characterization of the modified alloy, uni-axial tensile tests were performed. Therefore, 9 pseudo-elastic NiTi wires of 120 mm were examined for tension resistance.

Sets of 3 wires each were heat treated in a furnace at
500° C. for 4 hrs (including rapid heating from room temperature to target temperature over 30 min), and subsequent cooling to 300° C. over 2 hrs (000_000_N);
600° C. for 1 hr (600_060_V);
575° C. for 45 min, subsequent cooling to 500° C. over 15 min, keeping the wires at 500° C. for 4 hrs, subsequent cooling to 300° C. over 2 hrs (575_conti_N);

Inert atmosphere (Ar-stream) was maintained only during the initial treatment (if any) at elevated temperatures of 570° C. and above. After removal of the wires from the furnace, they were left for cooling at ambient air.

The tensile test was performed based on ASTM F2616, with drawing speed settings being adapted to values recommended in publications of SFB 459 (Sonderforschungsbereich der Ruhr-Universitat Bochum).

The results of the uni-axial tensile test are shown in FIG. 12. As can be seen from the plot, a reference wire having undergone treatment of 500° C. for 4 hrs and cooling to 300° over 2 hrs (000_000_N) remains stiff at ambient temperatures. In contrast, the sets of samples that were subject to heat treatment at elevated temperatures reached elongation of 80% and more before slipping/rupture of the sample. The samples subject to high temperature treatment only (600° C. for 1 hr; 600_060_V, dashed line) can compensate for mechanical strain to some extent by deformation. However, the sample subject to high temperature treatment (at 575° C. for 45 min) and where this treatment is followed by more moderate heat-treatment at 500° C. for 3.5 hrs (controlled cooling to 300° over 2 hrs; 575_conti_N, dotted line) could compensate best for mechanical strain by deformation.

It can be concluded that only materials that were subject to a combined heat-treatment in steps at distinct temperature ranges provide an optimal balance between homogeneity of microstructure and tensile strength of the material, therefore allowing good resistance to cyclic fatigue, resistance to crack initiation/propagation and satisfactory compensation for mechanical load.

The invention claimed is:

1. Method for manufacturing or modifying an endodontic instrument made from an NiTi alloy, by performing a heat-treatment comprising the steps of:
providing a NiTi endodontic instrument made of a shape memory alloy;
heating the endodontic instrument to a first temperature range
between 550° C. and 625° C.;
keeping the endodontic instrument in the first temperature range during a first time period of 20 min to 90 min, and subsequently
allowing the endodontic instrument to cool down to a second temperature range
between 400° C. and 549° C.,
keeping said endodontic instrument in the second temperature range during a second time period of at least 180 min.

2. Method according to claim 1, wherein a working portion of the endodontic instrument in an unloaded state is substantially linear.

3. Method according to claim 1, wherein the heat treatment further comprises the step of:
after keeping the endodontic instrument in the second temperature range, allowing the endodontic instrument to cool down to a third temperature range between 250° C. and 350° C., over a time period of 90 min to 150 min.

4. Method according to claim 1, wherein the endodontic instrument after the heat-treatment is allowed to cool down in air at ambient conditions.

5. Method according to claim 1 wherein at least the steps occurring within the first temperature range at least partially are performed in vacuum or in inert gaseous atmosphere.

6. Method according to claim 1, wherein the endodontic instrument is kept during the first period of time at a first substantially constant temperature and/or is kept during the second period of time at a second substantially constant temperature.

* * * * *